US009725098B2

(12) United States Patent
Abou-Nasr et al.

(10) Patent No.: US 9,725,098 B2
(45) Date of Patent: Aug. 8, 2017

(54) VEHICLE DRIVER IDENTIFICATION

(71) Applicant: Ford Global Technologies, LLC, Dearborn, MI (US)

(72) Inventors: Mahmoud A. Abou-Nasr, Canton, MI (US); Devinder Singh Kochhar, Ann Arbor, MI (US); Walter Joseph Talamonti, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/800,527

(22) Filed: Jul. 15, 2015

(65) Prior Publication Data

US 2016/0039429 A1 Feb. 11, 2016

Related U.S. Application Data

(60) Provisional application No. 62/035,611, filed on Aug. 11, 2014.

(51) Int. Cl.
*B60W 50/10* (2012.01)
*G06F 3/01* (2006.01)
*G06K 9/00* (2006.01)

(52) U.S. Cl.
CPC ............ *B60W 50/10* (2013.01); *G06F 3/017* (2013.01); *G06K 9/00355* (2013.01); *B60W 2420/905* (2013.01)

(58) Field of Classification Search
CPC ...... G06T 2207/30196; G06K 9/00389; G06K 9/00832; G06K 2009/00395; G06K 9/00335; G06K 9/00885; G06F 3/017; G06F 21/32; G06F 21/316; H04L 29/06809; B60W 50/10; B60W 2420/905
USPC ............. 382/103, 115; 340/5.52, 5.81, 5.82; 715/863
See application file for complete search history.

(56) References Cited

U.S. PATENT DOCUMENTS 8,744,645 B1 6/2014 Vaghefinazari et al.
8,761,998 B2 6/2014 Chen et al.
2009/0327977 A1 12/2009 Bachfischer et al.
2010/0083373 A1* 4/2010 White .................... G06F 3/017 726/21
2010/0278393 A1* 11/2010 Snook .................... G06F 3/011 382/107
2013/0004016 A1* 1/2013 Karakotsios ....... G06K 9/00355 382/103

(Continued)

FOREIGN PATENT DOCUMENTS

DE 2007023140 A1 10/2008
EP 2323022 A2 5/2011

OTHER PUBLICATIONS

GB Search Report dated Jan. 18, 2016 (3 pages).

*Primary Examiner* — Jon Chang
(74) *Attorney, Agent, or Firm* — Frank A. MacKenzie; Bejin Bieneman PLC

(57) ABSTRACT

A user gesture is detected based on received data from one or more motion sensors. User gesture attributes are identified including at least one of hand vectoring, wrist articulation, and finger articulation from the gesture including respective movements of each of a plurality of a user's fingers. Based on the gesture attributes, a user and an action to be performed in a vehicle are identified. The action is performed in the vehicle to control at least one vehicle component based on the gesture.

16 Claims, 5 Drawing Sheets

300
Start
Collect gesture attributes 305
Identify driver and passenger 310
Multiple gestures performed? 315
YES
NO
Determine driver action 320
Perform action 325
End

(56) References Cited

U.S. PATENT DOCUMENTS

| | | | | |
|---|---|---|---|---|
| 2013/0204457 | A1 | 8/2013 | King et al. | |
| 2014/0309879 | A1* | 10/2014 | Ricci | H04W 48/04<br>701/36 |
| 2014/0310788 | A1* | 10/2014 | Ricci | B60Q 1/00<br>726/6 |
| 2015/0131857 | A1 | 5/2015 | Han et al. | |
| 2015/0177842 | A1* | 6/2015 | Rudenko | G06F 3/017<br>345/156 |
| 2015/0193111 | A1* | 7/2015 | Kauffmann | G06F 3/017<br>715/825 |

* cited by examiner

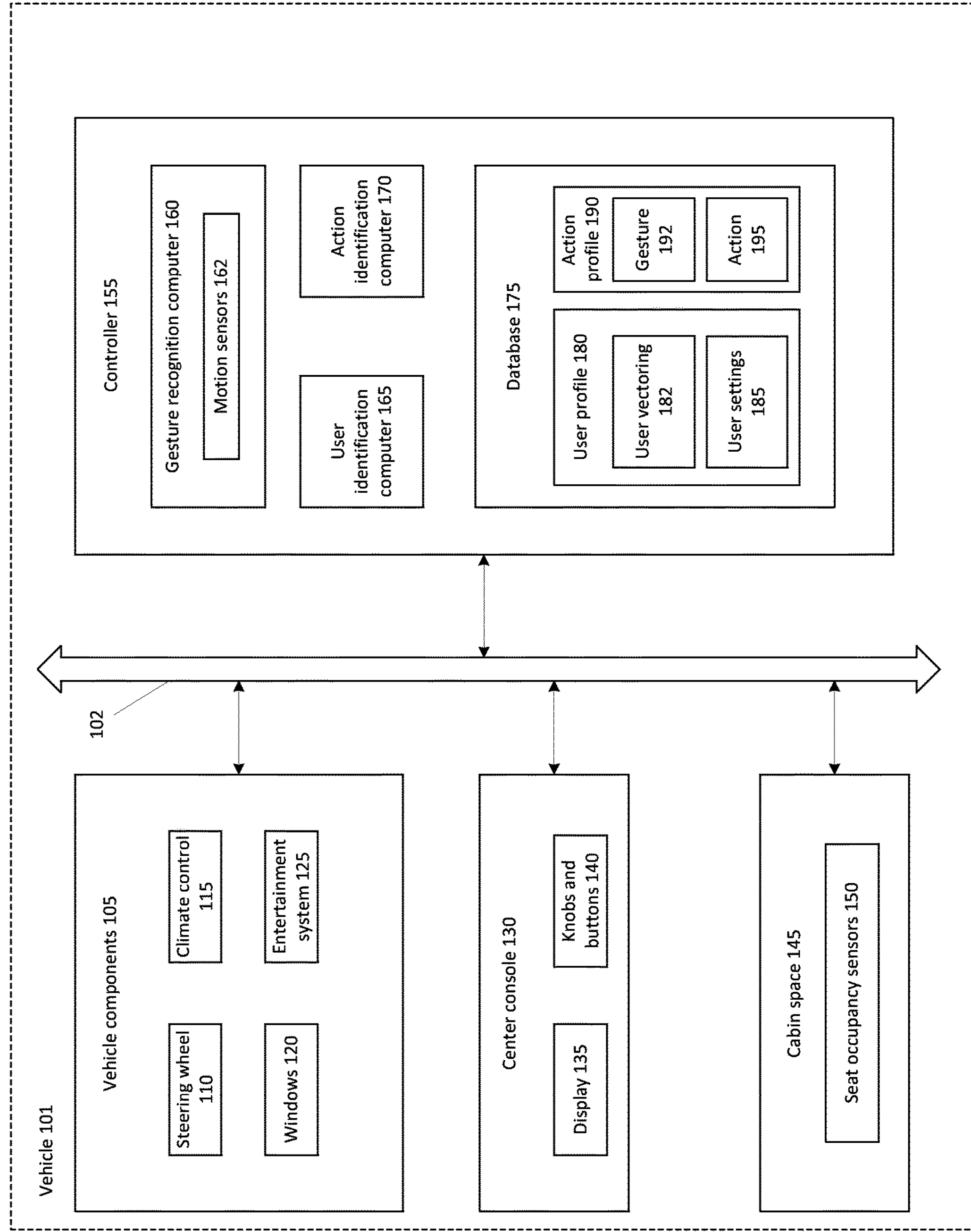
FIG. 1
100
Vehicle 101
Vehicle components 105
Steering wheel 110
Climate control 115
Windows 120
Entertainment system 125
Center console 130
Display 135
Knobs and buttons 140
Cabin space 145
Seat occupancy sensors 150
102
Controller 155
Gesture recognition computer 160
Motion sensors 162
User identification computer 165
Action identification computer 170
Database 175
User profile 180
User vectoring 182
User settings 185
Action profile 190
Gesture 192
Action 195

VEHICLE DRIVER IDENTIFICATION

CROSS-REFERENCE TO RELATED APPLICATION

This application claims priority to U.S. Provisional Application Ser. No. 62/035,611 filed Aug. 11, 2014, which is hereby incorporated herein by reference in its entirety.

BACKGROUND

When multiple drivers use a vehicle such as a car, each driver, i.e., operator may have distinct vehicle setting preferences. Biometric systems can be incorporated into vehicles to enable a car controller to identify (or predict an identity of) a current driver, also referred to as the "user" or "operator," and automatically adjust vehicle settings to match the identified user's preferences. For example, biometric systems may identify a vehicle operator based on fingerprint data, retinal data, facial features, etc. Still other systems may use specific gestures preformed around a particular vehicle element (such as a steering wheel) to adjust selected vehicle settings. However, present systems are lacking at least with respect to identifying a particular gesture of a particular operator.

BRIEF DESCRIPTION OF THE DRAWINGS

FIG. 1 is a block diagram of a vehicle gesture system.

DESCRIPTION

Figure 2:
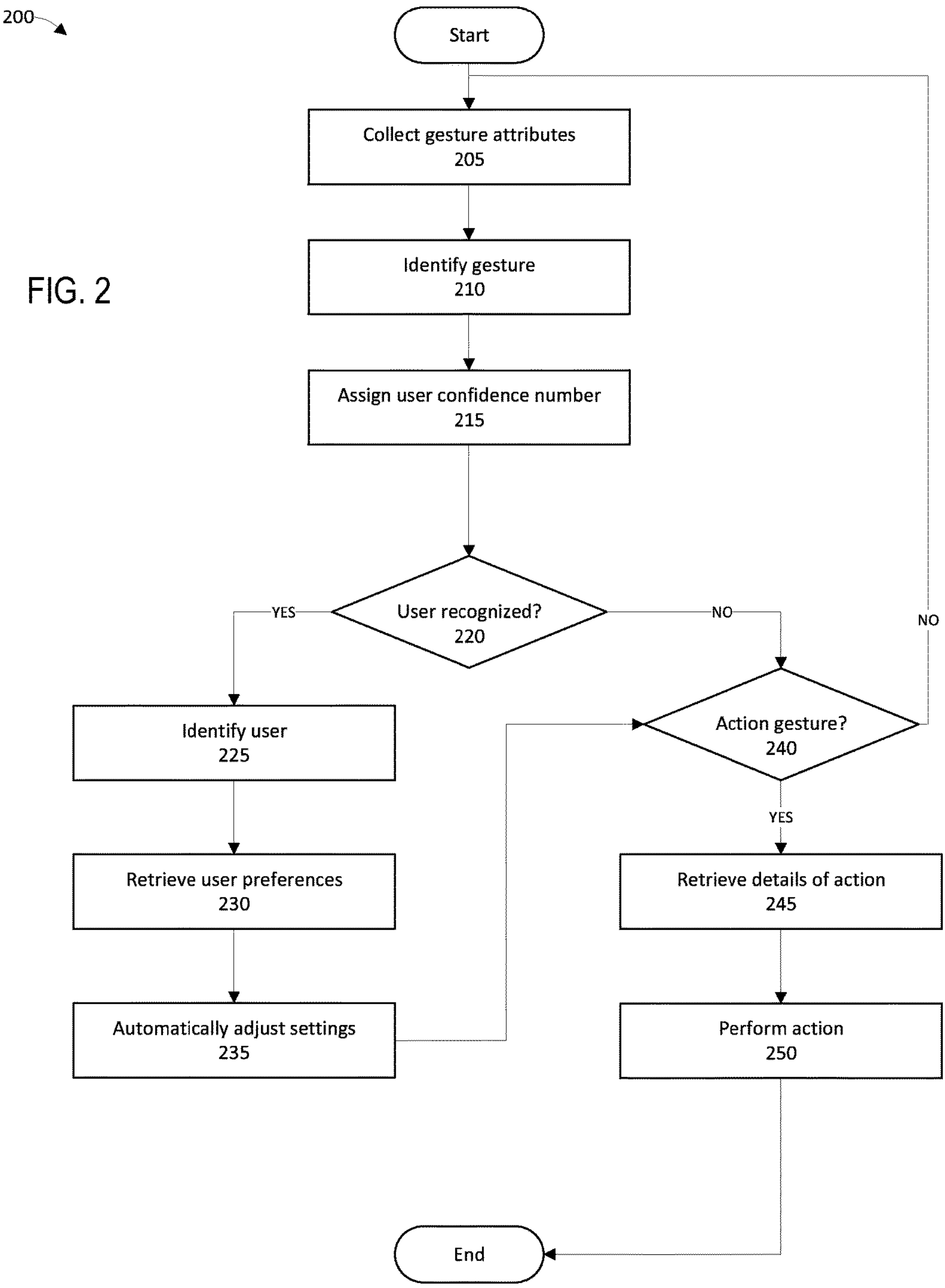
FIG. 2 is a block diagram of an exemplary process for identifying a user and performing an action based off of a gesture.

A vehicle controller may be programmed to resolve ambiguity when a same gesture is performed by different vehicle occupants. For example, if a gesture is performed by a vehicle driver near a steering wheel while the same gesture is performed by a vehicle passenger near a window, the controller may be programmed to identify a vehicle element, e.g., the steering wheel or window, to be adjusted. Further, the controller may be programmed to determine which occupant's settings should be applied. The controller thus provides a mechanism to distinguish between different operators performing the same gesture, where otherwise the gesture performed by a first operator could even lead to a second, different operator's settings being applied, inconveniencing the first operator. As another example, a same gesture may be correlated with two distinct actions. For example, a specific hand gesture may be used by a first driver to adjust the vehicle rear view mirror. At the same time, the same specific hand gesture may also be used by a second, different operator to adjust vehicle volume control. Advantageously, a controller can be programmed to distinguish between such gestures.

It has been recognized that, even for a given gesture, each person generally has a distinctive way of articulating the gesture. As an example, vectoring of the hand and fingers when performing a gesture may vary between individuals. These variations can be learned and advantageously used to identify vehicle operators. Vehicle settings can then be adjusted in accordance with recognized gestures, i.e., a gesture identified with a particular individual. For example, the vectoring of the hand and fingers, as well as finger articulation, can be used to trigger one or more outputs. In addition, gestures may be learned contextually so that a controller can know which gesture to override if multiple vehicle occupants perform the same gesture at the same time. Finally, gestures may be learned contextually such that a common gesture can be used for both identification of a driver as well as for adjusting vehicle settings.

In one example, a knob rotation gesture may be used to identify and distinguish different vehicle operators. The knob rotation gesture may include rotation of any knob on a center console of a vehicle, or rotation of a specific knob (e.g., entertainment system volume knob) on the center console by a vehicle operator. A controller may learn a specific hand vectoring for each vehicle operator when performing the knob rotation and use it to identify and distinguish different operators. For example, each operator's hand vectoring and finger articulation when rotating the knob may be learned iteratively during vehicle operation. Alternatively, the vectoring may be learned during a distinct calibration process, such as when (or each time) an operator first enters the vehicle. As non-limiting examples, various attributes of the gesture as performed by a specific operator may be learned, such as an operator's handedness, an angle of entry when initiating the knob rotation, a number of fingers used to rotate the knob (the operator's "footprint"), the speed of rotation, as well an extent of rotation (e.g., an end point relative to a start point of rotation). In this way, specific attributes of a given gesture as performed by different vehicle operators may be learned. In addition, specific attributes of different gestures as performed by a given vehicle operator may also be learned. For example, in addition to learning a given user's way of knob rotation, the user's specific way of performing a swiping gesture may also be learned, such as a handedness (e.g., whether the operator swipes from left to right or from right to left), the angle of entry of the swipe, the start and end point of the swipe, the trajectory of the swipe, etc.

A vehicle control system may include programming in the controller for gesture recognition. In addition, the controller, which is a computer including a processor, and a memory storing instructions executable by the processor, may be programmed to recognize a user based on the gesture recognition. The controller memory may include a database that stores user profiles for multiple vehicle operators. Each operator's user profile may include user specific settings for various vehicle elements. For example, settings pertaining to a user's preferred air conditioner setting, window setting, radio setting, etc., may be stored. In addition, the user profile may include the user's specific hand vectoring for different gestures. In response to a gesture, the controller may use the various gesture attributes to identify the gesture. The controller may use the identified gesture as well as the vectoring of the hand when the gesture is performed to identify a user by querying the database.

In addition to using the gesture for identifying the operator, a gesture may also be associated with an action, whereby the controller may be programmed to identify the action. The database may include an action profile where a detailed list of gestures and their related actions are stored. For example, a swiping gesture in a first direction may be associated with an action to increase the volume setting of the vehicle's entertainment system. In another example, a swiping gesture in the opposite direction may be associated with an action to decrease the volume setting of the vehicle's entertainment system.

In one example, a swiping gesture may be used to adjust an entertainment system volume. For example, in response to a hand being swiped from left to right in mid-air in the vehicle cabin, a volume of the in-vehicle entertainment system may be increased. A controller may learn a specific hand vectoring for each vehicle operator and use it to identify and distinguish different operators. Each operator's hand vectoring and finger articulation when rotating the knob may be learned. For example, attributes such as an operator's handedness, an angle of entry when initiating the knob rotation, a number of fingers used to rotate the knob (the operator's "footprint"), etc. may be learned.

Thus, when a gesture is performed, a controller may identify an action associated with the gesture based on the gesture attributes while identifying an operator performing the gesture based on the hand vectoring when the gesture is performed. Consequently, when an operator approaches an entertainment system knob to rotate it, the controller may identify the operator based on the way the knob is approached and may automatically select a preferred radio station stored in the given operator's user profile. In addition, a volume setting of the entertainment system may be increased or decreased based on the directionality of knob rotation.

In some embodiments, gestures performed by vehicle occupants other than the operator may be given lower priority and/or ignored. For example, based on a swiping gesture, a vehicle operator may be identified and it may be determined that the operator wishes to select a particular radio station. A similar swiping gesture performed by a vehicle passenger may be recognized as being performed by an alternate user due to a hand vectoring of the same gesture being associated with the passenger and not the operator. Consequently, the controller may determine that a radio station selection is being made by an alternate user. To avoid confusion and chaos, the radio station selection of the alternate user may be temporarily ignored.

In this way, gestures may be used to perform actions in a vehicle while an articulation of the gesture, including the specific hand and finger vectoring when performing the gesture can be used to identify a vehicle operator. This allows operator settings to be adjusted with less confusion. In addition, by identifying the operator and adjusting the weightage of gestures performed by different vehicle occupants, confusion caused when multiple vehicle occupants perform various gestures for adjusting vehicle settings is reduced. Overall, a vehicle operator's in-vehicle experience is improved.

FIG. 1 illustrates an exemplary vehicle gesture system 100. The system 100 includes a vehicle 101. The vehicle 101 includes a bus 102, vehicle components 105, a center console 130, cabin space 145, and a controller 155.

The bus 102, e.g. including a controller area network (CAN) bus or the like, such as is known, may be used to provide various communications, including data from the controller 155 to the console 130, as well as one or more instructions from the controller 155 to the vehicle components 105.

The vehicle components 105 can include a steering wheel 110, a climate control system 115, windows 120, and an entertainment system 125. The steering wheel 110 may be of any suitable type, and may be adjusted depending on the preferences of the user. The climate control system 115, e.g. an HVAC system, may maintain a preferred temperature in the vehicle 101. The windows 120 may be selectively opened or closed in any suitable manner. The entertainment system 125 may include, e.g., a radio, a connection port for a portable device, a plurality of speakers, etc.

The center console 130 includes a display 135 and a plurality of knobs and buttons 140. The display 135 may be of any suitable type, e.g., an LCD screen, and may display a variety of information. For example, the display may show the current radio station, the song and artist performing, and/or current temperature as controlled by the climate control system 115.

The knobs and buttons 140 may selectively adjust any or all of the vehicle components 105. For example, one button may activate the climate control system 115, while another activates the windows 120, and a knob may adjust the volume of the entertainment system 125.

The cabin space 145 includes seat occupancy sensors 150. The seat occupancy sensors 150 determine whether one or both of the front seats is occupied. If only one seat is occupied, then a user gesture must be coming from the driver. If both are occupied, then the controller 155 will determine whether the gesture is performed by the driver or the passenger.

The controller 155 includes programming to recognize one or more gestures. The controller 155 receives inputs from one or more motion sensors 162, e.g., via the bus 102. The controller 155 records gesture attributes, including hand vectoring, wrist articulation, finger articulation, location within a vehicle, position of gesture relative to a vehicle component, motion at gesture initiation, and motion at gesture termination.

The controller 155 is also programmed to perform user identification. The controller 155 collects gesture attributes and based thereupon determines an identity of the user. For example, each person has certain unique gesture attributes that the controller 155 can recognize and store. For example, a user's hand vectoring, palm motion, and/or finger articulation may produce a gesture signature that is substantially unique to the user. Based on such gesture attributes, the controller 155 can identify specific users, even when multiple users are performing gestures.

The controller 155 is further programmed to identify actions associated with detected gestures. The action identification computer 170 compares detected gesture attributes to stored gesture attributes associated with actions. For example, if the finger articulation indicates a rotation, the associated action may be to increase or decrease the volume on the entertainment system 125.

The controller 155 includes or is communicatively coupled to a database 175. The database 175 may be of any suitable type, e.g., hard disk drives, solid-state drives, or any other volatile or non-volatile media.

The database 175 typically stores a plurality of user profiles 180. The user profiles 180 include user vectoring 182 and a set of user settings 185. The user vectoring 182 includes gesture attributes associated with specific users, and are used to identify a user based on the gesture attributes collected by the controller 155. The user setting 185 are predetermined settings for the vehicle components, including, e.g., preferred radio stations, steering wheel position, climate control temperature, and/or window position.

The database 175 includes a plurality of action profiles 190. The action profiles 190 include a stored gesture 192 and a stored action 195. The stored gesture 192 is compared to the gesture attributes collected by the gesture recognition computer 160, from which a specific gesture 192 is selected.

The stored action 195 is an action associated with the stored gesture 192 that is performed when the stored gesture 192 is recognized.

Figure 4:
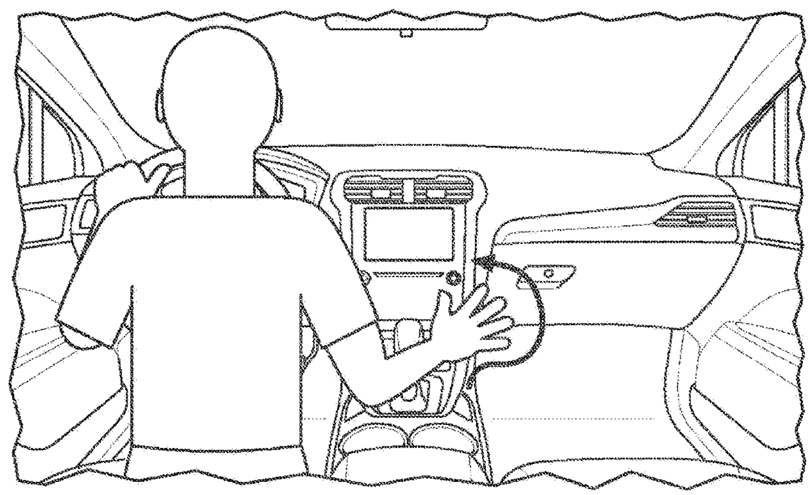
FIG. 4 is an exemplary illustration of a vehicle user performing the gesture.

FIG. 2 illustrates a process 200 for gesture recognition and action performance. The process 200 starts in a block 205, where the motion sensors 162 collect gesture attributes from a user's gesture. For example, as the user performs the gestures, e.g., as illustrated in FIG. 4, the controller 155 collects gesture attributes, e.g. hand vectoring, finger articulation, etc.

Next, in a block 210, the controller 155 identifies the gesture based on the gesture attributes. Specifically, the gesture recognition computer 160 compares the collected gesture attributes collected in the block 205 and compares them to the action profiles 190 to determine a specific gesture 192 and associated action 195. In one example implementation, a dynamic neural network may be trained as a multi-class classifier for recognizing gestures. The inputs to the dynamic neural network are the sequential vectors of the gesture attributes (e.g. fingers articulation, hand vectoring, location within a vehicle, position of gesture relative to a vehicle component, motion at gesture initiation, and motion at gesture termination). The network has three layers and the first two layers have bipolar sigmoid neurons. The final layer of the network is a softmax classifier which maps network classification decision to a set of probabilities P(action=y|X), where P is the probability of action y given the X vector of inputs to the network.

Next, in a block 215, the controller 155 assigns a user confidence value, e.g., a number, to the gesture. The user identification computer compares the gesture attributes to the gesture profiles 180, assigning a value for how closely the gesture attributes match the user vectoring 182. The user confidence number is based on the gesture attributes, including hand vectoring, finger articulation, location within a vehicle, position of gesture relative to a vehicle component, motion at gesture initiation, and motion at gesture termination. In one instance of implementation, the confidence value emanates from the probabilities calculated by a softmax classifier (the final layer of the neural network), such as is known. The user confidence value, which may be expressed on a scale of zero to one, or zero to one-hundred percent, is a measure of how closely the gesture attributes match the attributes of stored users.

Next, in a block 220, the controller 155 determines whether the user is stored in the database 175. Specifically, the controller compares the confidence number to a predetermined threshold for recognizing the user. If the user is recognized, the process 200 continues in a block 225. Otherwise, the process 200 continues in a block 240.

In the block 225, the controller 155 identifies the user based at least in part on the user confidence number. Specifically, the user identification computer 165 assigns the user profile 180 with the highest confidence number is selected as the probable user of the gesture attributes.

Next, in a block 230, the controller 155 retrieves user preferences from the database 175. Specifically, the controller 155 retrieves the user settings 185 from the database 175. The user preferences may include preferred radio stations, climate control settings, steering wheel placement, etc.

Next, in a block 235, the controller 155 automatically adjusts the vehicle components 105 to the user settings 185.

In the block 240, the controller 155 determines whether the gesture is an action gesture. Specifically, the action identification computer 170 compares detected gesture attributes to the action profiles 190 and the stored gestures 192 for a matching gesture. If so, the process 200 continues in a block 245. Otherwise, the process 200 continues in the block 205 to collect gesture attributes.

In the block 245, the controller 155 compares the action gesture to stored actions in the database 175. Specifically, the controller 155 compares the gesture attributes to the stored gestures 192 in the action profiles 190 to determine the specific action 195.

Next, in a block 250, the controller 155 performs the action 195 determined in the block 245 and the process 200 ends. For example, the controller 155 may send an instruction, e.g., via the bus 102, to entertainment system 125 to control a volume of a radio, to a window actuator to move a window 120 up or down, to a climate control system 115 to increase or reduce a temperature setting, etc.

Figure 3:
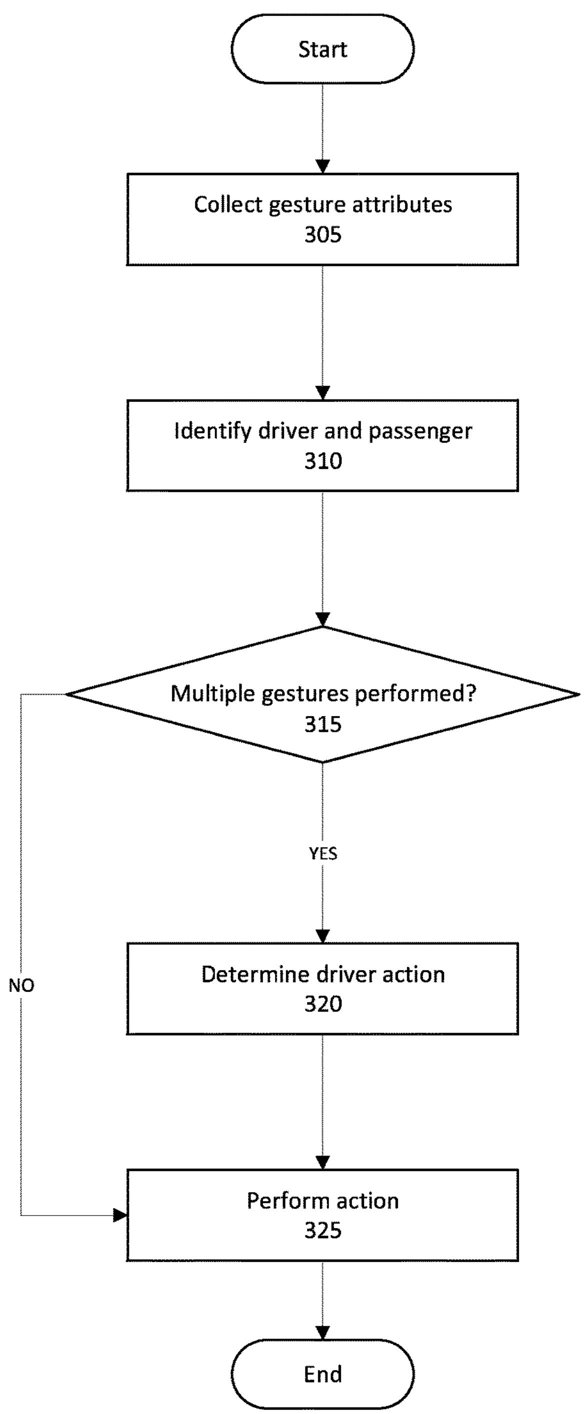
FIG. 3 is a block diagram of an exemplary process for selecting a single action from multiple gestures.

FIG. 3 illustrates a process 300 for selecting an action from multiple detected gestures. For example, when multiple gestures are detected from multiple vehicle occupants, the controller 155 may selectively perform only actions by the driver of the vehicle 101. The process 300 starts in a block 305, where the controller 155 collects gesture attributes.

Next, in a block 310, the controller 155 analyzes the gesture attributes to determine whether the user performing the gesture is the driver or the passenger. Specifically, the gesture attributes collected by the gesture recognition computer 160, e.g. hand vectoring, wrist vectoring, and finger articulation, differ depending on whether the user is sitting in a driver's seat or a passenger's seat. The differences may include, e.g., angle of the user's hand, motion of the user's hand, etc. The user identification computer 165 may determine both the specific user of the gesture attributes and whether the user is the driver or the passenger. The gesture recognition computer 160 may also use information from the seat occupancy sensors 150 to determine whether both the driver and the passenger are present. Based on these differences, the gesture recognition computer 160 and the user identification computer 165 may determine whether the gesture is being performed by the driver or the passenger.

Figure 5:
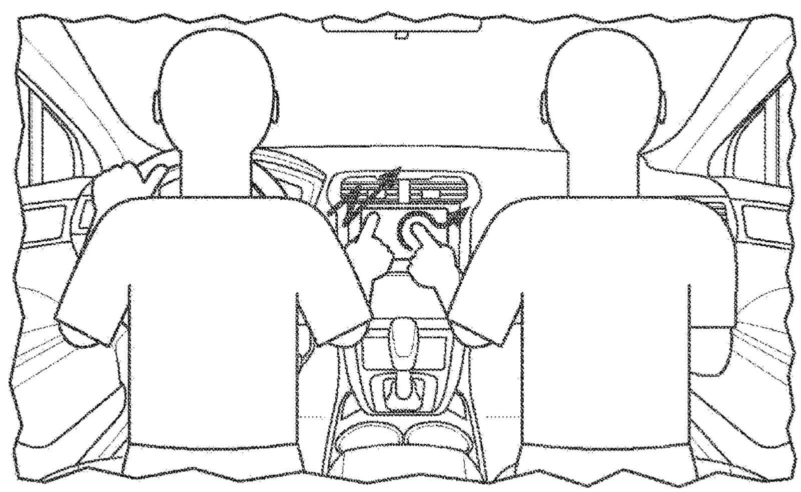
FIG. 5 is an exemplary illustration of a pair of vehicle users performing multiple gestures.

Next, in a block 315, the controller 155 determines whether multiple gestures are being performed simultaneously. The driver and the passenger may both be performing gestures, as illustrated in FIG. 5. The gesture recognition computer 160 records the gesture attributes and determines whether only one or multiple gestures are being performed. The controller 155 may only perform one action at a time, so if multiple gestures are being performed, the process continues in a block 320. Otherwise, the process continues in a block 325.

In the block 320, the controller 155 determines which of the multiple gestures is being performed by the driver using the information determined in block 310 by the user identification computer 165. The controller 155 will preferably perform the action of the driver.

Next, in the block 325, the controller 155 performs the selected action and the process 300 ends. Specifically, the action identification computer 170 takes the driver's gesture and compares to the action profiles 190 in the database 175 and performs the desired action 195.

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc.

In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM. DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:

detect a user gesture and a second user gesture based on received data from one or more motion sensors;

identify user gesture attributes for the user gesture and the second user gesture including at least one of hand vectoring, wrist articulation, and finger articulation from the gesture including respective movements of each of a plurality of a user's fingers;

wherein the gesture attributes further include at least one of motion at gesture initiation and motion at gesture termination;

based on the identified gesture attributes, identify a user and a second user and actions to be performed in a vehicle;

determine whether one of the user and the second user is a driver and the other of the user and the second user is a passenger; and upon determining that the driver and the passenger performed their respective gestures at the same time, perform the action in the vehicle to control at least one vehicle component according to the gesture of the driver and ignore the gesture of the passenger.

2. The system of claim 1, wherein the instructions further include instructions to adjust one or more vehicle components according to one or more predetermined user settings based on the gesture attributes.

3. The system of claim 2, herein the vehicle components include at least one of a steering wheel, a climate control system, a window control, and an entertainment system.

4. The system of claim 2, wherein the instructions further include instructions to retrieve the predetermined user settings from a vehicle database.

5. The system of claim 1, wherein the instructions further include instructions to assign a user confidence number to the gesture attributes, the user confidence number being a measure of how closely the gesture attributes align with stored gestures for users.

6. The system of claim 5, wherein the instructions further include instructions to identify the user based at least in part on the user confidence number.

7. The system of claim 1, wherein the gesture attributes further include at least one of location within a vehicle and positon of gesture relative to a vehicle component.

8. The system of claim 1, wherein the user gesture is a knob rotation.

9. The system of claim 1, wherein the user gesture is a hand swipe.

10. A method, comprising:

detecting a user gesture and a second user gesture based on received data from one or more motion sensors;

identifying user gesture attributes for the user gesture and the second user gesture including at least one of band vectoring, wrist articulation, and finger articulation from the gesture including respective movements of each of a plurality of a user's fingers;

wherein the gesture attributes further include at least one of motion at gesture initiation and motion at gesture termination;

based on the identified gesture attributes, identifying a user and a second user and actions to be performed in a vehicle;

determining whether one of the user and the second user is a driver and the other of the user and the second user is a passenger; and upon determining that the driver and the passenger performed their respective gestures at the same time, performing the action in the vehicle to control at least one vehicle component according to the gesture of the driver and ignoring the gesture of the passenger.

11. The method of claim 10, further comprising adjusting one or more vehicle components according to one or more predetermined user settings based on the gesture attributes.

12. The method of claim 11, wherein the vehicle components include at least one of a steering wheel, a climate control system, a window control, a navigation system, and an entertainment system.

13. The method of claim 10, further comprising assigning a user confidence number to the gesture attributes.

14. The method of claim 13, further comprising identifying the user based at least in part on the user confidence number.

15. The method of claim 10, wherein the gesture attributes include at least one of location within a vehicle and positon of gesture relative to a vehicle component.

16. The method of claim 10, wherein the user gesture is at least one of a knob rotation and a hand swipe.

* * * * *